United States Patent [19]
Woessner

[11] Patent Number: 5,353,897
[45] Date of Patent: Oct. 11, 1994

[54] VIBRATION DAMPER

[75] Inventor: Felix Woessner, Schweinfurt, Fed. Rep. of Germany

[73] Assignee: Fichtel & Sachs AG, Schweinfurt, Fed. Rep. of Germany

[21] Appl. No.: 947,166

[22] Filed: Sep. 18, 1992

[30] Foreign Application Priority Data

Sep. 21, 1991 [DE] Fed. Rep. of Germany ....... 4131532

[51] Int. Cl.$^5$ ............................................. F16F 9/53
[52] U.S. Cl. .................................. 188/267; 188/269; 188/322.16; 188/322.19
[58] Field of Search ............... 188/267, 269, 276, 279, 188/285, 299, 315, 322.16, 322.17, 322.19, 322.5; 280/707, 714

[56] References Cited

U.S. PATENT DOCUMENTS

| | | | |
|---|---|---|---|
| 3,527,451 | 9/1970 | Long | 188/315 |
| 4,508,201 | 4/1985 | Axthammer et al. | 188/322.19 |
| 4,819,772 | 4/1989 | Rubel | 188/299 |
| 4,955,460 | 9/1990 | Lizell et al. | 188/322.17 |
| 4,971,180 | 11/1990 | Kobayashi et al. | 188/315 |
| 5,069,317 | 12/1991 | Stoll et al. | 188/299 |
| 5,080,392 | 1/1992 | Bazergui | 188/299 |
| 5,217,095 | 6/1993 | Lizell | 188/299 |

FOREIGN PATENT DOCUMENTS

| | | |
|---|---|---|
| 0382171 | 8/1990 | European Pat. Off. . |
| 3532293 | 3/1987 | Fed. Rep. of Germany . |
| 3905639 | 9/1989 | Fed. Rep. of Germany . |
| 4-282040 | 10/1992 | Japan .................... 188/267 |

*Primary Examiner*—Robert J. Oberleitner
*Assistant Examiner*—Chris Schwartz
*Attorney, Agent, or Firm*—Brumbaugh, Graves, Donohue & Raymond

[57] ABSTRACT

A vibration damper has a variable damping effect. The variation of the damping effect is obtained by a control valve. This control valve is subject to the pressure force of a damping liquid on the one hand and to a pressure force of a electrorheological liquid on the other hand. The pressure force of the electrorheological liquid is responsive to the viscosity of this electrorheological liquid. The viscosity of this electrorheological liquid is responsive to variation of a high voltage electrical field applied to the electrorheological liquid within a flow path. The pressure force obtained by the pressure of the damping liquid acts in a first direction onto a valve body of the control valve. The pressure force resulting from the pressure of the electrorheological liquid acts in a second direction onto the valve body. The direction of both pressure forces are invariable irrespective of the direction of movement of the piston rod with respect to the cylinder.

23 Claims, 6 Drawing Sheets

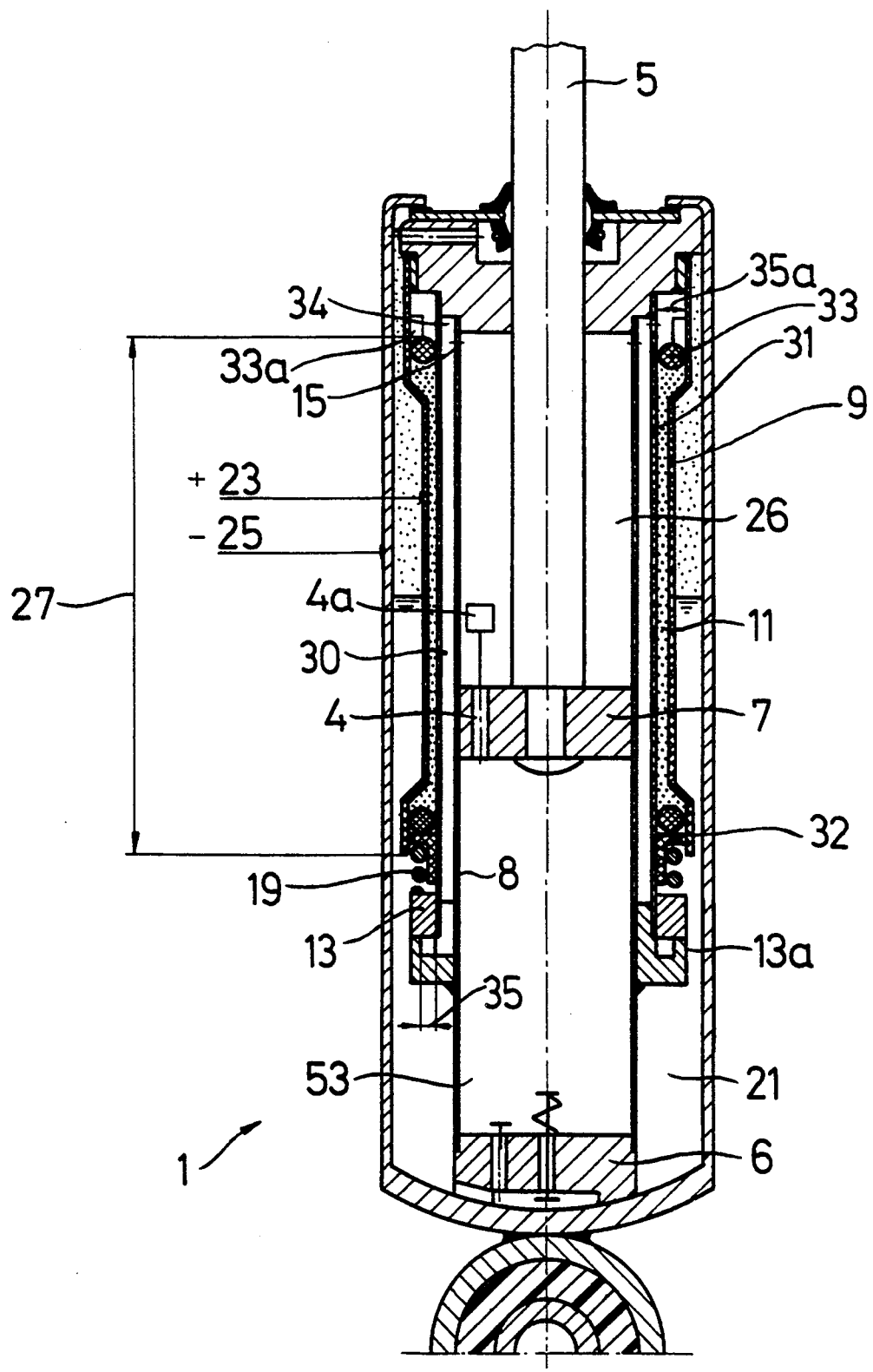

VIBRATION DAMPER

BACKGROUND OF THE INVENTION

This invention relates to a vibration damper, preferably to be used in motor vehicle wheel suspensions, the damping effect of which can be changed by the intensity of an electrical field applied to a volume of a electrorheological liquid.

Modern motor vehicles, in particular top-quality motor vehicles, are equipped with adjustable vibration dampers in order to achieve, on the one hand, a soft chassis setting for comfort in travel and, on the other hand, a taut sports setting for the range of higher speeds of travel. It is possible, for example, to equip the damper with damping valves of which the damping power is adjustable via electromagnets. These damping valves are very complicated in construction and correspondingly expensive and sensitive. Alternatively, vibration dampers are known which contain an electrorheological medium which changes its viscosity under the influence of a high voltage within a capacitor arrangement. The variable viscosity of the medium is the basis for the adjustable damping. The electrorheological medium is simultaneously used as a control medium and as a damping medium.

STATEMENT OF THE PRIOR ART

The high costs and the inadequate resistance to ageing of the electrorheological medium led to a development which is described in detail in DE-OS 39 05 639, namely the separation of damping medium and control medium, conventional mineral oil being used as damping medium. Outside its working chambers, this damper possesses a damping valve which operates as a speed-dependent throttling device without the influence of high voltage but changes in its damping action when a high voltage is applied. In principle, the damping valve has the lowest damping power in the pressure stage and the highest damping power in the pulling stage when the high voltage is switched off. When the high voltage is applied, the damping power changes in opposite directions, i.e. the pressure stage damping power increases and the pulling stage damping decreases. However, this characteristic behaviour does not meet the requirements of practical setting of damping power.

A further construction detail to be improved is that, during a change of the viscosity of the control medium inside the control section, great pressure differences arise within the electroheological part and in turn lead to delays in the change of damping power. These pressure differences occur because a condenser arrangement in the control section markedly impedes the flowing movement of the electrorheological control medium only over a portion. The control medium is compressed between the valve body and the control section in one portion of the electrorheological control circuit and is relaxed in the other portion between control section and rear of valve body. Although there is a control medium compensating chamber with pressure using a membrane, the membrane often has to overcome the flow resistances of a partial section of control medium.

The design of the capacitor for the blockable control section allows a long capacitor but the spiral passage allows the windings to have only a relatively small mean radius which, in an approximation, roughly corresponds to the mean value between the smallest and the greatest winding radius. However, the mean throughflow diameter should be adequately large for achieving a maximum increase in the viscosity of the control medium. With the spiral design, moreover, changing states of viscosity observed over the length of the condenser can arise with constant voltage at the capacitor faces owing to the changing radius. Consequently, the high voltage has to be brought to an excessive level to ensure that the viscosity of the control medium comes into effect over the entire length of the capacitor. Otherwise, a vacuum can arise between the valve body and spiral throughflow section, ensuring that control medium is aspirated from the spiral or that the valve body is obstructed in its path of movement. The control medium compensating chamber cannot overcome this drawback as it can only act on the valve body in the dead status (FIG. 3 of DE-OS 39 05 639).

The arrangement of the damping device outside the working chambers inevitably leads to long connecting channels for the damping medium. Consequently, an additional throttling effect occurs during winter running, this throttling effect being difficult to estimate and having to be taken into consideration within a control device. The damping device also has a relatively large number of individual parts which again necessitate very precise production.

It is noted that the valve body area loaded by the damping medium on the pulling side is generally greater than the area of the electrorheological control medium. This results in an undesirable transmission ratio as the viscosity of the control medium has to be increased over-proportionally. According to data from control media producers, however, the increase is currently limited.

OBJECT OF THE INVENTION

An object of the invention is to provide a vibration damper which is simple in construction, has an electrorheological control medium for an adjustable damping valve, may be controlled rapidly and precisely, corresponds to the general desired characteristic in its damping power changing behaviour and allows for the viscosity increases in the control medium.

SUMMARY OF THE INVENTION

A vibration damper of variable damping effect comprises a cylindrical tube member having an axis, two ends and a cavity between said two ends. A piston rod member extends inwards and outwards of said cavity through piston rod guiding and sealing means and is movable along said axis. A piston unit is connected with said piston rod member inside said cavity and separates two working chambers from each other. Said working chambers contain a damping fluid. A damping fluid flow channel system is connected with the working chambers and permits a flow of damping fluid there through in response to axial movement of said piston rod member with respect to the tube member. Damping fluid throttling means are allocated to the damping fluid flow channel system for throttling the flow of damping fluid and thereby damping the axial movement of said piston rod member with respect to the tube member. Said damping fluid throttling means provide an electrically controllable flow resistance. Said flow resistance is controlled by a volume of an electrorheological control fluid separated from the damping fluid. Said electrorheological control fluid provides a control force for controlling the flow resistance. The control force is responsive to the viscosity of the electrorheological fluid flowing through a control flow path. The electrorheological fluid is within the control flow path exposed to an electrical field of variable field intensity. The viscosity is responsive to variation of the field intensity. Variation of the field intensity in a predetermined sense of one of the lowering sense and the increasing sense provides a variation of the damping effect in a corresponding predetermined sense of one of the lowering sense and the increasing sense irrespective of the direction of relative movement of the piston rod member and the tube member.

Preferably the damping fluid throttling means comprise at least one valve unit providing an electrically controllable flow resistance. The valve unit has a valve body movable along a path of movement in response to fluid pressure forces acting thereupon. The valve body is loadable by a first pressure force exerted by the damping fluid and a second pressure force exerted by the volume of electrorheological control fluid separated from the damping fluid. The second pressure force exerted by the volume of electrorheological control fluid is controllable by variation of the viscosity of the electrorheological control fluid within the control flow path. The electrorheological control fluid is within the control flow path exposed to the electrical field of variable field intensity. The viscosity is responsive to variation of the field intensity. The first pressure force acts onto said valve body in a first predetermined direction along the path of movement. The second pressure force acts onto said valve body in a second predetermined direction along said path of movement. Said first and said second predetermined directions of the first pressure force and the second pressure force, respectively, are substantially unchanged irrespective of the direction of relative movement of the piston rod member with respect to the tube member.

The damping power can simultaneously be increased or reduced in the pulling direction and in the pressure direction according to the requirements imposed on the chassis setting with respect to the variation in damping power. A decisive factor for this possibility of damping power variation is that hydraulic opening forces directed in the same sense in the pulling direction and in the pressure direction act on the valve body. A condition for this is that a movable valve body be loaded by the damping medium on the valve seat side and by the control medium and/or a spring force on the valve body rear. This clear division between control medium and damping medium basically simplifies practical implementation.

The viscosity of the control medium may not be increased at random. For a type of hydraulic transmission, the pressure-loaded faces on the valve body on the damping medium side are smaller than or equal to those on the control medium side.

To avoid long flow paths for the parallel path of the damping medium between the working chamber and the damping medium compensating chamber there is a connecting section which may be blocked smoothly by a movable valve body which is pressure loaded on the one hand by the damping medium and on the other hand by the electrorheological control medium. The connecting section advantageously also possesses only one throughflow direction between the damping medium compensating chamber and the working chambers.

To ensure at all times that the adjustable damping valve can move rapidly into a different opening position when the viscosity of the control medium decreases on reduction of the high voltage, the adjustable damping valve arranged in parallel over the flow path is controlled on the one hand by the damping medium and on the other hand from a series arrangement consisting of a spring force and a control medium pressure force. In a variation, the adjustable damping valve arranged in the flow path relay is controlled on the one hand by the damping medium and on the other hand from a parallel arrangement consisting of a spring force and a control medium pressure force. To assist operation of the movement of the damping valve, a nonreturn valve arranged in parallel with the control section is installed between a control medium compensating chamber and the adjustable damping valve. The nonreturn valve opens in the case of an increased pressure in the control medium compensating chamber relative to the control section. In a variation, the nonreturn valve for the control medium is switched against a spring load.

To avoid pressure differences within the control section, the control section is subjected to a pressure bias by a spring resting on a component rigid with the cylinder and a sealing member. According to an advantageous improvement, the control section may also be subjected to a gas pressure. In a specific embodiment, the end faces of the control section loaded by the damping medium pressure are of different sizes. This produces a type of floating control section containing temperature compensation for the damping power. If the damping medium expands under the influence of temperature, the static pressure within the control medium increases simultaneously so that the closing forces acting on the damping valve also increase. In a further embodiment of the invention, the control section is separated from the damping medium at one end by an axially movable sealing member. In this embodiment, the maximum damping power exists when the control section circuit is dead, and this is a significant safety feature.

In comparison with the prior art, the control section arranged concentrically to the cylindrical tube allows clearly improved spatial economy and optimisation of the form of the control section with respect to the important characteristics such as length of control section and mean diameter of the control section.

To avoid having to reduce the quantity of damping medium owing to the existing bulk of the damper, .the control section is arranged outside the working chambers. According to an advantageous improvement,the control section extends between a capacitor tube and a tube spaced coaxially from the cylindrical tube. Components from a conventional series damper may advantageously be used. In view of the small number of parts and the space requirement, it is possible for the control section to extend between the cylinder and the capacitor and to represent a particularly worthwhile variation. In embodiments of the invention in which the control section is not arranged in a floating manner, a compensating chamber for the control medium which is subjected to a pressure bias has to be provided to avoid a pressure difference within the control medium. According to one possibility, a compensating chamber for the control medium may be formed between the capacitor tube and an elastic membrane. According to a further possibility, the control medium compensating chamber is subjected to a gas cushion pressure.

In a variation of the invention which is particularly worthwhile for shock-absorbing legs or single-tube vibration dampers, the damping valve with a variable damping power is arranged inside a hollow piston rod. For each working chamber, the piston rod has an inlet channel to a damping medium intermediate space in which a spring-loaded valve body controls the throughflow between the two inlet channels. A resultant opening force consisting of a working pressure multiplied by a flow-on face and a pressure reduced by the throttling of the damping valve multiplied by a flow-on face act accordingly in the pressure stage direction with respect to the valve body. A resulting opening force consisting of a working pressure multiplied by a flow-on face and a pressure reduced by the throttling of the damping valve multiplied by a flow-on face act in the pulling stage direction with respect to the valve body. The design of the area ratios on the valve body affords very great flexibility in the design of the damping powers.

The various features of novelty which characterize the invention are pointed out with particularity in the claims annexed hereto and forming a part of the disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

The invention and its advantages are to be described in detail with reference to the following description of drawings, in which FIGS. 3 and 4 show a hydraulic circuit diagram and an associated embodiment in which the adjustable damping valve is controlled by damping medium on both sides.

DETAILED DESCRIPTION OF THE PREFERRED EMBODIMENTS

Figure 1:
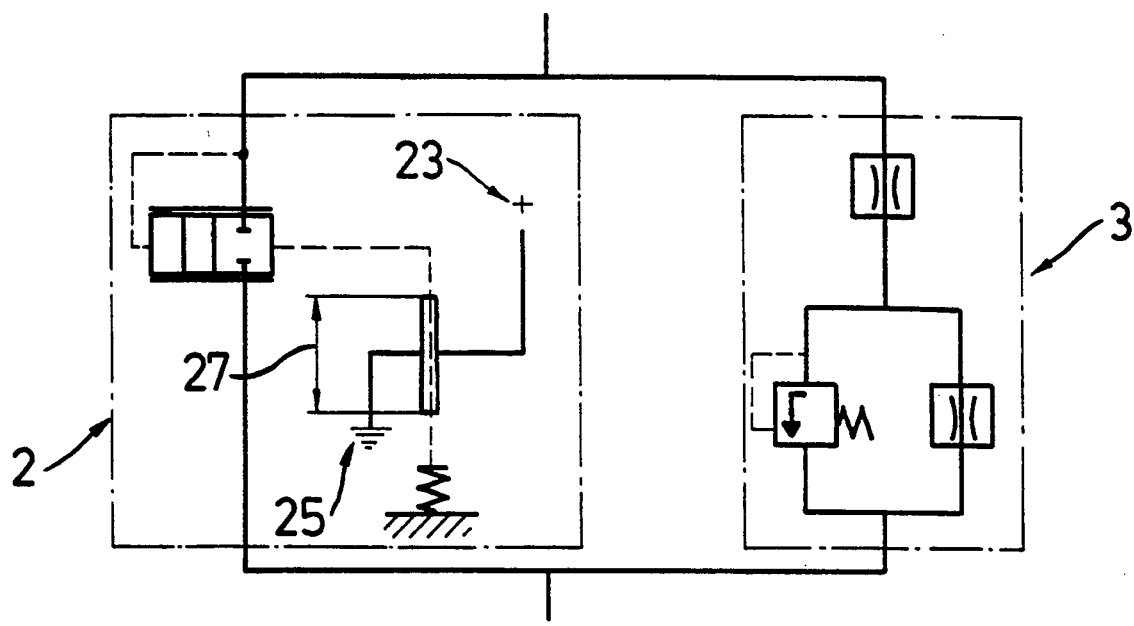
FIGS. 1 and 2 show a hydraulic circuit diagram and a corresponding embodiment in which the control medium for the variable damping valve is subjected to a spring bias.

The vibration damper 1 in FIG. 1 has a damping valve 2 with variable damping power and a speed-dependent throttle valve 3 arranged in parallel. It can be seen that the damping valve 2 has only one throughflow direction. The damping valve 2 is controlled on the one hand by the damping medium and on the other hand from a series arrangement consisting of a spring force and a pressure force, within an electrorheological control medium, the spring resting on a component rigid with the cylinder.

Figure 2:
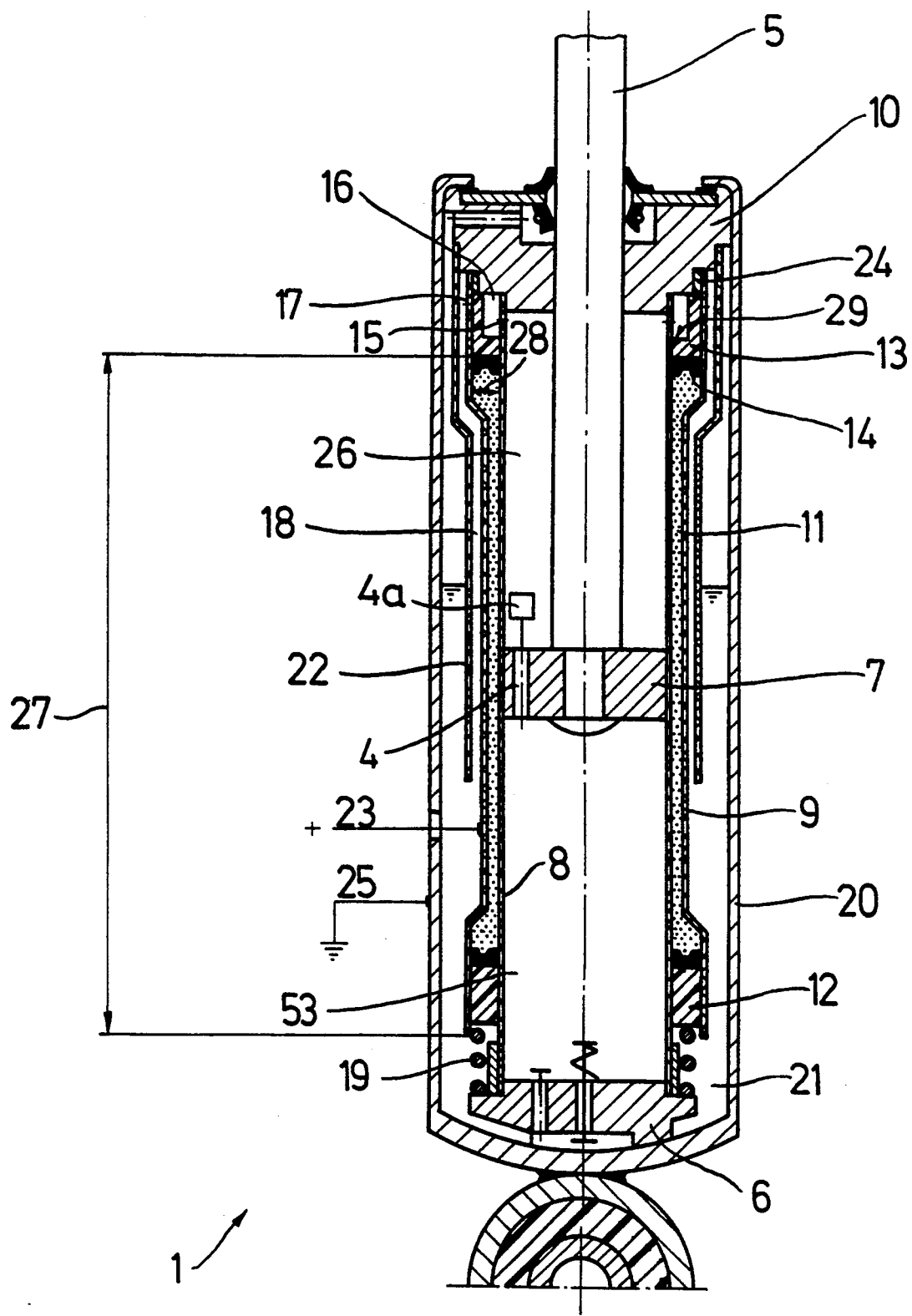

FIG. 2 shows the technical transformation of the circuit diagram according to FIG. 1. A piston valve 4 on an axially movable piston rod 5 and a bottom valve 6 on a cylinder bottom contain the speed-dependent throttling means. A working chamber is divided into two by the piston 7. A cylindrical tube 8 limits the working chamber and is at the same time a constituent of a capacitor. A capacitor tube 9 positioned by a piston rod guide 10 is arranged at a coaxial distance from the cylindrical tube 8. A sealing unit is mounted above the piston rod guide 10. The cylindrical tube 8 and the condenser tube 9 form an annular chamber 11 axially limited on the one hand by a spring-loaded seal guiding member 12 and on the other hand by a valve body 13 in conjunction with a seal 14. The annular chamber 11 is filled with an electrorheological control medium which increases its viscosity when a high voltage is applied. The cylindrical tube 8 has, in the region of the piston rod guide 10, an outlet bore 15 which opens into an annular chamber 16. This annular chamber 16 is substantially limited by the valve body 13. At the same level, the capacitor tube 9 has a connecting bore 17 which opens in a calming channel 18. The damping valve therefore consists of the capacitor tube 9, the cylindrical tube 8, the spring 19, the valve body 13 and the respective bores in the cylindrical tube 8 and in the condenser chamber 9. A container 20 surrounds the entire damping device and forms a damping medium compensating chamber 21 with the capacitor tube 9. To avoid bubbling and to reduce the quantity of damping medium, an immersion sleeve 22 is mounted in the compensating chamber. A connecting contact 23 to a voltage source is provided on the capacitor tube 9. The capacitor tube 9 is consequently electrically separated from the cylindrical tube 8 by an insulating ring 24. A corresponding electric outlet contact 25 is provided on the container 20. The adjustable damping valve acts as a conventional throttling device when the capacitor is dead. The vibration damper 1 has the lowest damping power under this condition. During the movement of the .piston rod 5, the damping medium is displaced from a working chamber 26 via the outlet bore 15. The pressure force of the damping medium moves the valve body 13 against the flow resistances within a control section 27 which is axially limited by the seal 14 and the spring force, the valve body 13 clearing the connecting bore 17 to the calming channel 18.

When a high-voltage is applied to the capacitor tube 9, the viscosity of the control medium increases and blocks the connecting section 15, 16, 17 between the working chamber 26 and the damping medium compensating chamber 21 as required in each case. A computer (.not shown) determines the necessary voltage for the capacitor. The spring 19 keeps the control medium under a pressure bias in any situation. On the damping medium side 29, the valve body 13 has a smaller area than on the control medium side 28, forming a type of hydraulic transmission.

The construction of the capacitor tube 9 contains a large mean control section diameter and a large axial length in the region of the control section 27. A high-voltage of comparatively small value is therefore required or, conversely, a large increase in viscosity is achieved. The available space is optimally utilised owing to the concentric arrangement of the tubular damper parts.

The operation of the vibration damper so far described is as follows:

When the piston rod 5 moves downwards with respect to the tube 8 the valve system 4a allocated to the passage 4 through the piston 7 provides only a small flow resistance.

On the other hand the bottom valve system 6 provides a high flow resistance. As a result thereof the pressure of the damping liquid rises both in the lower working chamber 53 and in the upper working chamber 26 due to the increasing volume of the piston rod 5 emerging into the cavity 26,53. The increasing pressure within the working chamber 26 acts onto the upper face 29 of the valve body 13. By this pressure acting onto the upper face 29 of the valve body 13 the valve body 13 is moved downwards against the action of the helical compression spring 19 acting onto the spring loaded sealing and guiding member 12. As long as no or only a low electric field exists between the cylinder tube 8 and the capacitor tube 9 the electrorheological control liquid within the chamber 11 and, more particularly, within the flow path 27 has only low viscosity. The valve body 13 can be easily moved downwards by the pressure of the damping liquid acting onto the face 29 against the action of the helical compression spring 19. Downwards movement of the valve body 13 causes opening of the bore 17 or an increase of the free cross-sectional area of the bore 17 such that the damping liquid can easily escape from the annular chamber 16 through the calming channel 18 to the compensating chamber 21. As a result thereof the damping effect is small because the bore 17 is—with a large cross-sectional area—in parallel with the bottom valve system 6.

When the direction of movement of the piston rod member 5 is reversed the flow resistance through the valve system 4a of the piston 7 is much greater so that again a high pressure occurs within the working chamber 26 being reduced in volume. The working chamber 53 is increased in volume, the bottom valve system 6 allows now an easy return of damping liquid from the compensating chamber 21 towards the working chamber 53 because the bottom valve system 6 offers only a small flow resistance for damping liquid flowing from the compensating chamber 21 towards the working chamber 53. The increased pressure within the working chamber 26 is again transferred through the bore 15 to the annular chamber 16 and urges the valve body 13 in a downwards direction against the action of the helical compression spring 19 acting onto the sealing and guiding member 12. Assuming again that no electrical field is applied between the cylindrical tube 8 and the capacitor tube 9 or only a small electrical field is applied there is no substantial flow resistance for the electrorheological fluid through the control flow path 27 such that the valve body 13 can easily move downwards and damping fluid from the working chamber 26 can escape through the bore 17 which is being increased in cross-sectional area by the downwards movement of the valve body 13. As a consequence one can state that also in the upwards movement of the piston rod 5 which is called pull operation as compared with the push operation occurring when the piston rod 5 is moved downwards, is only subject to a small damping effect because the cross-sectional area of the bore 17 is in parallel with the piston valve system 4a. Such the high flow resistance of the piston valve system 4a is ineffective for the damping effect because the damping liquid can easily escape through the bore 17 into the compensating chamber 21.

It is assumed now that a high-voltage electric field is applied to the electrorheological damping liquid within the control flow path 27. Then the viscosity of the electrorheological fluid within the control flow path 27 is increased. As a result thereof a high flow resistance resists to the downwards movement of the valve body 13, when by downwards or upwards movement of the piston rod member 5 an increased pressure comes up within the working chamber 26. Such the valve body 13 can't or can only slowly move downwards in response to the pressure within the annular chamber 16 and the cross-sectional area of the bore 17 remains zero or small and does not increase or increases only slowly. As a result thereof the damping effect of the vibration damper is a strong one because no or only little damping liquid can escape through the bore 17 to the compensating chamber 21. This is obviously true for both downwards and upwards movement of the piston rod 5.

One can see from the above description of the operation that the pressure force resulting from the pressure of the electrorheological liquid within chamber 11 is always directed upwards against the valve body 13 irrespective of the direction of movement of the piston rod 5 and that the pressure force resulting from the pressure within the working chamber 26 and acting through bore 15 onto the upper face 29 of the valve body 13 is always directed downwards irrespective of the direction of movement of the piston rod 5 with respect to the cylindrical tube 8. This is of high advantage because in principle it is only necessary to vary the intensity of the electrical field when one wants to modify the behaviour of the vibration damper between a smooth damping behaviour and a strong or sportive damping behaviour. It is in principle not necessary to change the intensity of the electrical field at any change of direction of movement of the piston rod 5. The great advantage is that the electrical control system controlling the intensity of the electrical field applied between the cylinder 8 and the capacitor tube 9 can be a relative simple one which must provide a change of intensity of the electrical field only if one wants to change the behaviour of the vibration damper between a smooth damping effect and a strong or sportive damping effect. When the intensity of the electrical field is increased the viscosity of the control liquid within the chamber 11 is increased and the damping effect is increased both for inwards movement and outwards movement of the piston rod 5 with respect to the cylinder 8.

It is to be noted that the strongest damping effect is obtained in this embodiment if the intensity of the electrical field is at a maximum.

Figure 3:
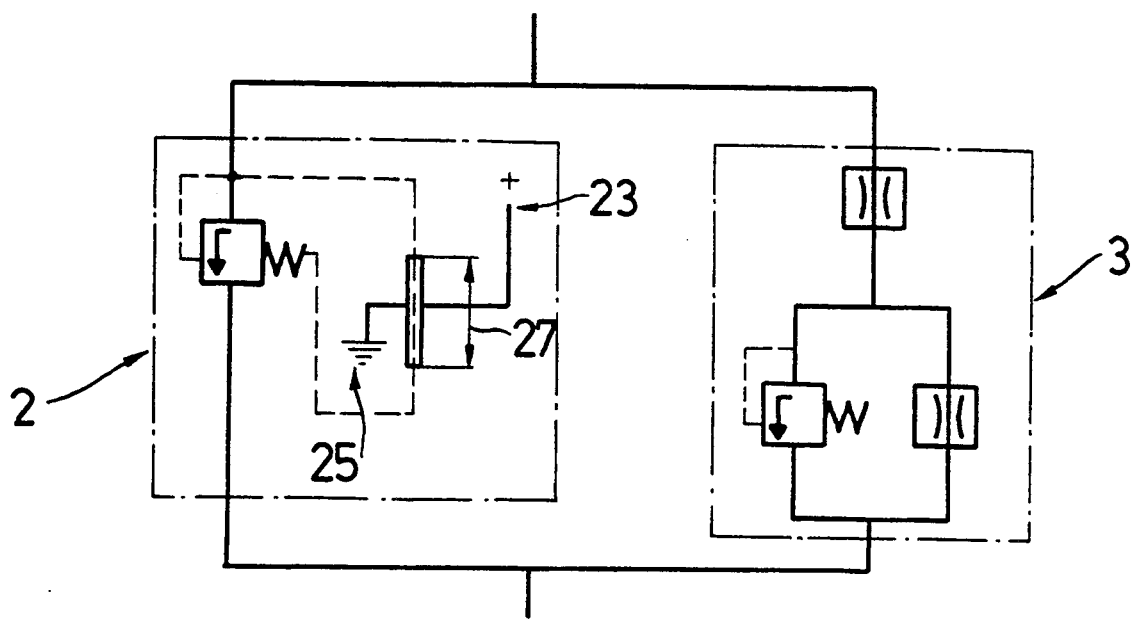

FIG. 3 shows a hydraulic circuit diagram with a damping valve 2 of variable damping power which is connected in parallel with a speed-dependent throttling valve 3 and is controlled directly or indirectly by damping medium connections. A floating arrangement of the control section is therefore obtained.

FIG. 4 shows a transformation of the circuit diagram according to FIG. 3. The essential components are identical to the vibration damper 1 from FIG. 2, so differences only will be mentioned. The connecting section consists of the outlet bore 15 as well as a fluid chamber 30 between the cylindrical tube 8 and a tube 31 spaced coaxially therefrom. A valve body 13 loaded by a spring 19 resting on a supporting member 32 together with seal is located at the end of the connecting section. A capacitor tube 9 forms, with a tube 31,.a control section 27 which is limited by an axially movable seal 33 on the side remote from the valve body. In the region above the seal 33, the tube 31 has a bore 34 attached to the fluid chamber 30. Consequently, both control section end faces are loaded with damping medium during a movement of the piston rod. As the end face 35 on the axially movable seal 33 is greater than that of the valve body 13, the valve 2 connected in parallel always remains closed when the capacitor is dead so the maximum damping action occurs. This is an important contribution to safety of travel. If a high-voltage is applied to the capacitor tube 9 and the viscosity increases, the spring 19 rests on the blocked control medium column and the valve body 13 can open the throughflow under the influence of the pressure force of the damping medium. The point of issue of the damping medium is set very deep inside the damper 1 so that a foam-preventing immersion sleeve may be dispensed with.

The movable seal 33 is limited against upwards movement by an abutment member 33a.

The bottom valve system 6 and the piston valve system 4a are again of such a design as discussed in connection with FIG. 2. With other words: Both on upwards movement and downwards movement of the piston rod 5 with respect to the cylinder 8 there is a tendency of pressure raise within the upper working chamber 26.

It is assumed now again that the electrical field within the chamber 11 is small and that as a result therefrom the viscosity of the electrorheological control fluid within the chamber 11 along the control flow path 27 is small.

When under these circumstances the pressure within the working chamber 26 is increased as a result of downwards or upwards movement of the piston rod 5 the pressure of the damping liquid within the upper working chamber 26 acts on both, the pressure receiving cross-sectional area 35 of the valve body 13 and on the larger pressure receiving cross-sectional area 35a of the annular seal member 33. As a result thereof the annular seal member 33 and the column of electrorheological control fluid within the chamber 11 are moved downwards with little flow resistance occurring within the chamber 11 so that the supporting member 32 is also moved downwards against the action of the helical compression spring 19. As a result thereof the helical compression spring 19 is axially compressed and acts onto the valve body 23 such as to keep it in tight engagement with the valve seat 13a. As a result thereof, one can state, that the pressurized damping fluid contained within the upper working chamber 26, though it can enter into the chamber 30, it can't escape into the compensating chamber 21. The resulting outflow resistance resisting the outflow of damping liquid from the working chamber 26 is therefore large and the damping effect of the vibration damper is high.

When on the other hand a strong electrical field is applied across the chamber 11 in radial direction the electrorheological control liquid within the chamber 11 along the control flow path 27 assumes high viscosity.

When now the pressure within the upper working chamber 26 is raised by either upwards or downwards moving of the piston rod 5, the pressure of this damping liquid again acts both on the upper face 35a of the annular seal member 33 and against the smaller cross-sectional area 35 of the lower surface of the valve body 13. In spite of the fact that the lower cross-sectional area 35 of the valve body 13 is smaller as compared with the upper cross-sectional area 35a above the annular seal member 33 the valve body 13 can be lifted from the valve seat 13a against the action of the helical compression spring 19 because the pressure acting onto the annular seal member 33a can't be transmitted downwards through the control flow path 27 because the viscosity of the control liquid within the chamber 11 is high.

As a result of lifting of the valve body 13 with respect to the valve seat 13a damping liquid can escape from the upper working chamber 26 through the annular space 30 and the valve unit 13,13a into the compensating chamber 21. The total flow resistance resisting the outflow of damping liquid from the upper working chamber 26 is therefore reduced and the damping characteristic of the vibration damper is a soft one.

It is a high advantage that in this embodiment the maximum damping effect of the vibration damper exists when no electrical field is applied across the annular chamber 11 in radial direction. Such in case of an accident in the electrical installation due to which the electric field breaks down the vibration damper is automatically switched to the hard damping effect which is of high importance for the safety.

Figure 5:
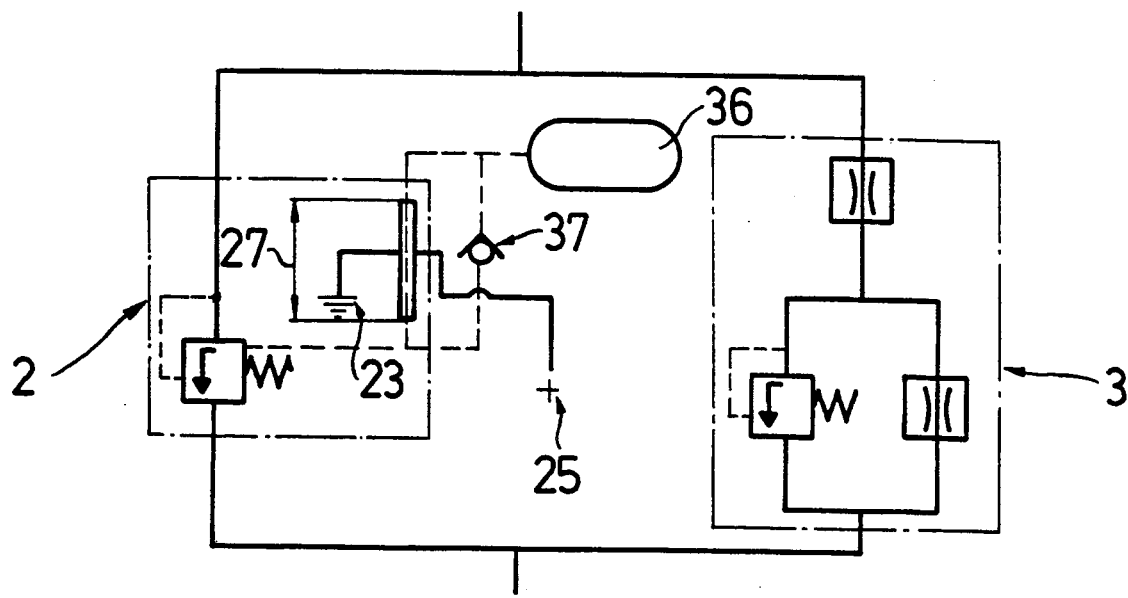
FIG. 5 shows a hydraulic circuit diagram with an adjustable damping valve which possesses a control medium compensating chamber with an associated non-return valve for the control section.

In the circuit shown in FIG. 5, the adjustable damping valve 2 has a control connection for the damping medium and a parallel control consisting of a spring force and the pressure force of the electrorheological control medium. In contrast to the variations described hitherto, the control medium is not arranged in a floating manner inside the control section 27. The control section 27 is connected to a control medium compensating chamber 36 which is subjected to a pressure bias. With regard to the damping valve 2, this means that the damping medium at the control connection acts against a spring force and the blocking force of the damping medium but can only switch it to a greater or lesser extent in the throughflow position as a function of a high-voltage. With a high-voltage and the associated viscosity of the control medium, the control medium can pass through a nonreturn valve 37 connected in parallel with the control section 27 and thus help the valve body 13 to move as rapidly as possible into a closed position without external valve control. Vacuum states, brought about by the control section 27, within the overall electrorheological section are compensated by the cleared nonreturn valve 37.

Figure 6:
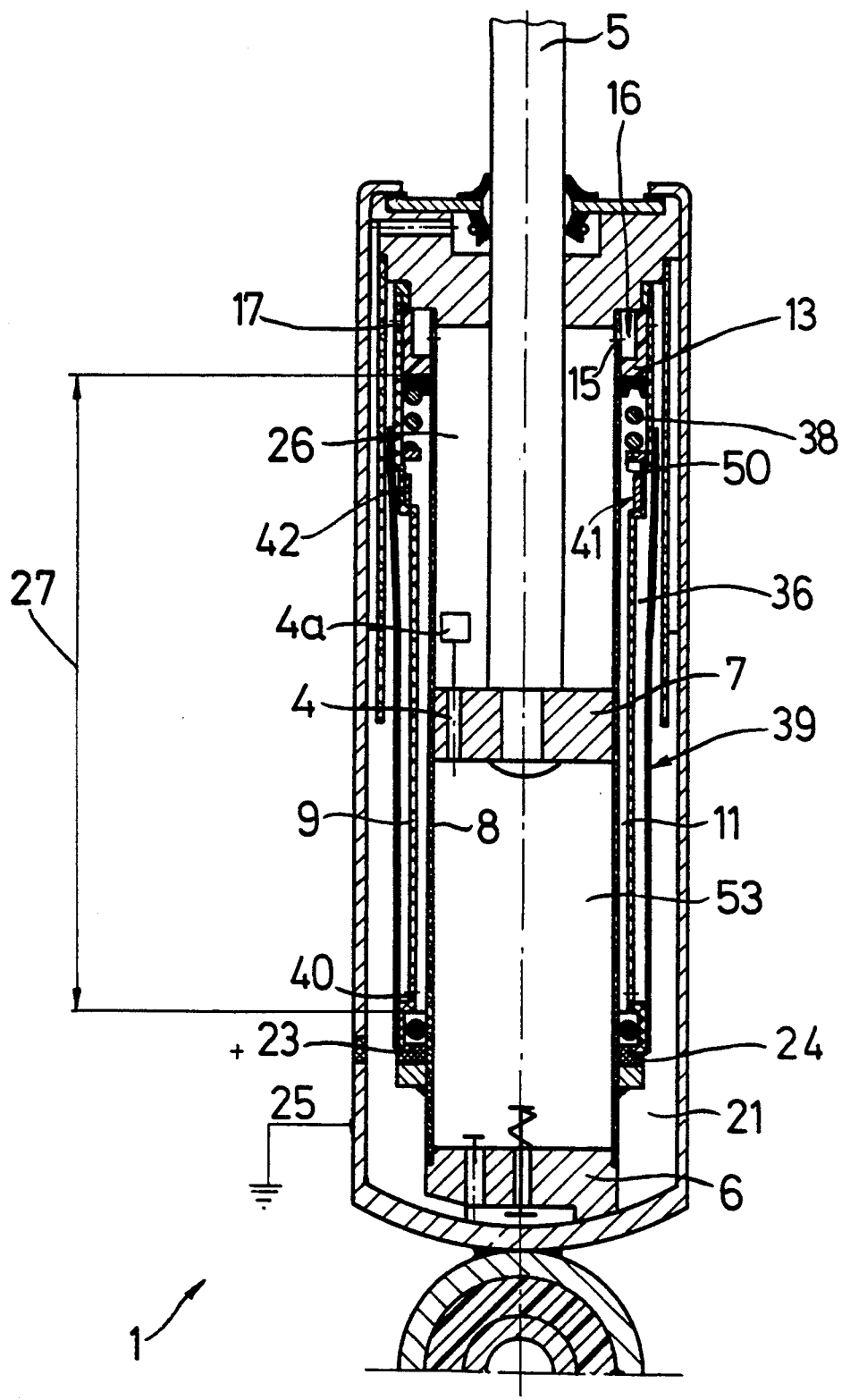
FIG. 6 shows a vibration damper with an adjustable damping valve of which the control medium compensating chamber is formed by a membrane in conjunction with a capacitor tube.

FIG. 6 illustrates one possibility for converting the circuit diagram according to FIG. 5 into an actual technical solution. It corresponds to the essential construction in FIG. 1 with the distinction that the valve body 13 is loaded by a spring 38 resting on the capacitor tube 9. Concentrically to the capacitor chamber 11 there is arranged an elastic membrane 39 forming, with the capacitor tube 9, an annular chamber which assumes the role of a compensating chamber 36 for the control medium. At the end of the control section 27 remote from the valve body 13 the condenser tube 9 has orifices 40 to the compensating chamber 36. An elastic ring 41 which seals a number of short-circuit bores 42 serves as a nonreturn valve 37. If the pressure produced by the elastic membrane 39 is lower within the control section 27 than in the control medium compensating chamber 36, the control medium can flow through these short-circuit bores 42 to the valve body 13 and the control section 27.

The operation of the vibration damper as shown in FIG. 6 is as follows:

The bottom valve system 6 and the piston valve system 4a are again of the same basic construction as described in connection with FIG. 2. With other words: Downwards movement and upwards movement of the piston rod 5 both have again the effect of increasing the pressure within the upper working chamber 26.

It is assumed now that there is no electrical field applied between the cylinder tube 8 and the capacitor tube 9. Such the viscosity of the electrorheological control fluid within the annular chamber 11 along the control flow path 27 is small. When the pressure of the damping liquid within the working chamber 26 is increased the pressure within the working chamber 26 acts upon the upper side of the valve body 13 within the chamber 16 through the bore 15. This pressure urges the valve body 13 downwards against the helical compression spring 38 which is supported by a support member 50 at the upper end of the capacitor tube 9. Downwards movement of the valve body 13 results in an increase of the effective cross-sectional area of the bore 17 connecting the upper working chamber 26 through a bore 15, annular chamber 16 and bore 17 with the compensating chamber 21. The downwards movement of the valve body 22 is not essentially braked down by the electrorheological liquid contained within the chamber 11 along the control flow path 27 because in the absence of an electrical field between the cylindrical tube 8 and the capacitor tube 9 the viscosity of the electrorheological fluid is small. Therefore the electrorheological fluid can in response to downwards movement of the valve body 13 escape from the annular chamber 11 through the bore 40 into the compensating chamber 36 confined between the capacitor tube 9 and the tubular membrane 39. As a result the increased cross-sectional area of the bore 17 the total outflow resistance against outflow of damping fluid from the working chamber 26 is small and the damping action of the vibration damper is also small. The vibration damper is in its soft status.

As soon as the piston rod 5 comes to a standstill after a movement in a upwards or downwards direction the pressure within the upper working chamber 26 falls. As a result of this pressure fall the valve body 13 is moved upwards again by the helical spring 38. Such electrorheological liquid can enter again from the compensating chamber 36 into the annular chamber 11. As long as the viscosity of the electrorheological liquid is small, as a result of the absence of an electrical field, the filling of the annular chamber 11 through the bore 40 may be satisfactory. An additional refilling effect may be provided, however, by the bore 42 through the capacitor tube 9 which is covered by the elastic sleeve member 41. This elastic sleeve member 41 works as a check valve. When the pressure of the electrorheological fluid within the chamber 11 is reduced as a result of upwards movement of the valve body 13 the elastic sleeve member 41 may be lifted radially inwards from the capacitor tube 9 with the result that electrorheological liquid can also flow through the bores 42 from the compensating chamber 36 into the annular chamber 11.

It is assumed now that a strong electrical field is applied between the cylindrical tube 8 and the capacitor tube 9 so that the electrorheological liquid within the chamber 11 along the control flow path 27 assumes a high viscosity.

When now again the pressure within the upper working chamber 26 is increased by either inwards or outwards movement of the piston rod 5 with respect to the cylinder 8 the valve body 13 is prevented from downwards movement or prevented at least from a fast downwards movement by the highly viscous electrorheological liquid contained within the annular chamber 11 because this highly viscous electrorheological liquid can't escape anymore through the bore 40 from the annular chamber 11 into the compensating chamber 36. Preventing the valve body 13 from downwards movement has the result that the bore 17 remains closed or maintains at least a small cross-sectional area. As a consequence thereof the total resistance to the outflow of damping liquid from the upper working chamber 26 towards the compensating chamber 21 is large and a strong damping effect is achieved.

Assuming now again that the piston rod 5 comes to a standstill after movement in downwards or upwards direction, it is quite clear that the pressure within the upper working chamber 26 falls. Assuming now that the valve body 13 has been moved downwards for a certain path return of the valve body 13 into its upper end position as shown in FIG. 6 would be very slow because the refilling through the bore 40 from the compensating chamber 36 is delayed by the high viscosity of the electrorheological liquid within the annular chamber 11. For this situation the existence of the check valve at 41,42 as described above is of high importance because the upper end portion of the annular chamber 11 can be relatively fast refilled through the check valve 41,42.

The solutions according to FIGS. 1 to 6 are particularly suitable for vibration dampers constructed according to the double tube damper principle.

Figure 7:
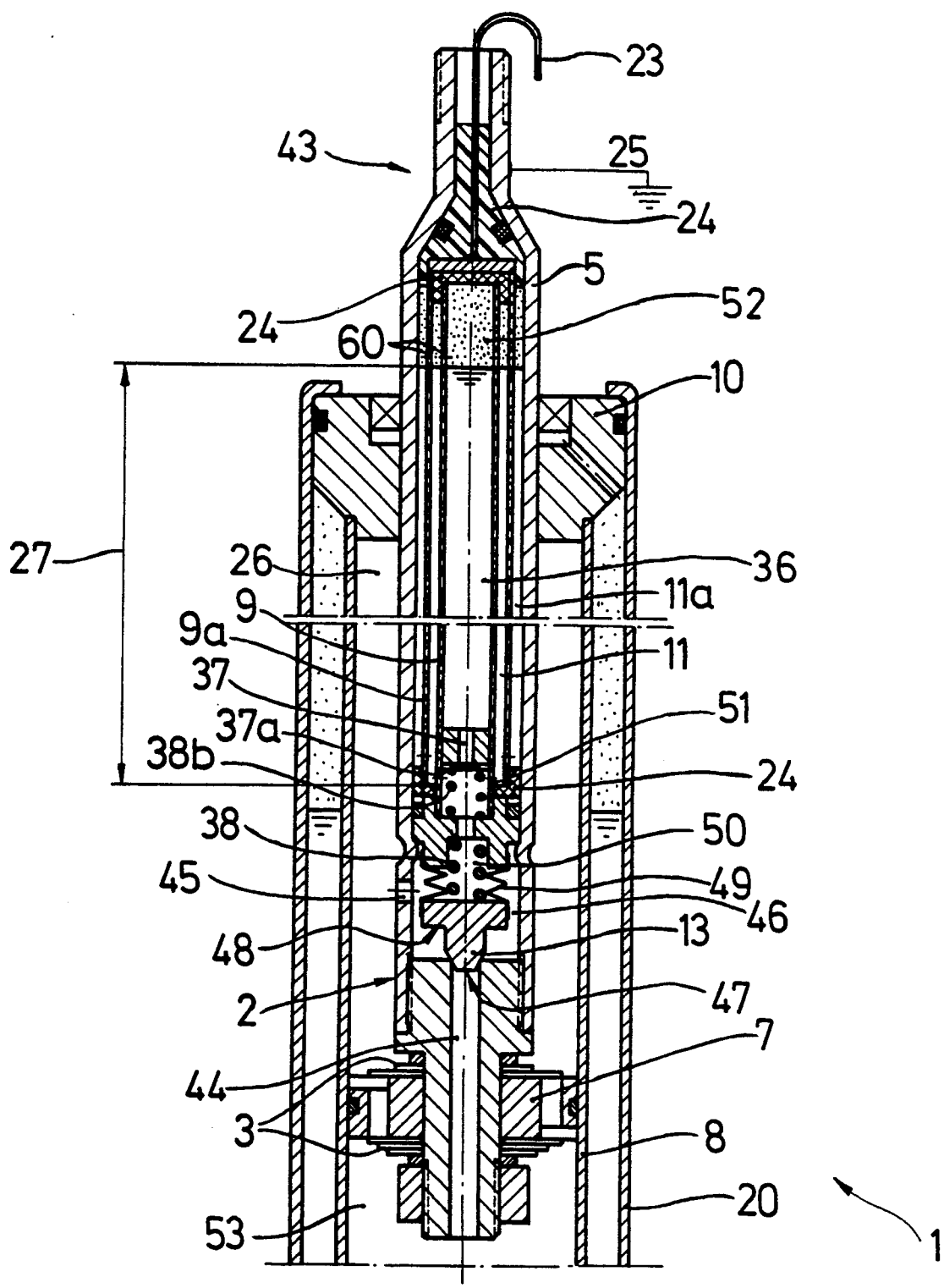
FIG. 7 shows a vibration damper with an adjustable damping valve inside a hollow piston rod.

FIG. 7 shows a detail of a damper 1 in which the damping valve 2, connected in parallel with a speed-dependent throttle valve 3, including a compensating chamber 36 for the control medium and a nonreturn valve 37 are arranged inside a hollow piston rod 43. A working piston with valve plate-equipped throttle channels is fastened on the piston rod 43 in this embodiment. An inlet channel 44 is introduced coaxially inside the piston rod 43 and opens into a damping medium intermediate space 46. This inlet channel 44 is sealed by an axially movable valve body 13 under the loading of a spring 38. A further inlet channel 45 connects the damping medium intermediate space 46 to the piston rod-side working chamber 26. The valve body 13 has a flow-on face 47, 48 for each inlet channel 44, 45, the flow-on face 47 which is loaded during the pressure stage preferably being smaller than that of the pulling stage. The control medium connection is located on the rear of the valve body 13. The rear of the valve body is separated from the damping medium intermediate space 46 by a sealing bellows 49. The interior of the bellows adjoins a collecting chamber 50. Connecting bores 51 lead from the collecting chamber 50 to chambers 11a within the control flow path 27, said chambers 11,11a being formed by the capacitor tubes 9, 9a. A spring-loaded nonreturn valve 37 is provided at the lower end of a control medium compensating chamber 36 inside the capacitor tube 9. The chamber 11,11a and the control medium compensating chamber 36 are subjected to the pressure bias of a gas cushion 52. When the capacitors are dead, a proportion of the damping medium is displaced via the speed-dependent throttling device 3 and the damping valve 2 arranged in parallel. The valve body 13 opens against the spring 38 inside the bellows 49. The pulling stage and pressure stage are in a defined ratio according to the cross-sectional areas of the flow-on faces 47, 48 or inlet channels 44,45.

In the pressure stage, the hydraulic opening force acts in the sum of the working pressure in the working chamber 53 multiplied by the flow-on face 47 as well as the reduced working pressure in the working chamber 26 multiplied by the flow-on face 48. In the pulling stage, the pressure in the working chamber 26 multiplied by the flow-on face 48 and the reduced working pressure in the working chamber 53 multiplied by the flow-on faces 47 acts on the valve body 13.

When a high-voltage is applied to the capacitors, the viscosity inside the control section 27 increases, decelerating the opening movement of the valve body 13. The overall damping power increases. When the high-voltage is reduced, with a diminishing pressure in the working chamber of the damper, the control medium flows from the control section 27 onto the rear of the valve body under the influence of the gas cushion 52. To enable the valve 2 to close relatively rapidly independently of the high-voltage, the nonreturn valve 37 opens in the control medium compensating chamber 36 as a result of the gas cushion 52. Therefore, a vacuum can never prevail in the rear space of the valve body.

The T-shaped cross section of the valve body 13 allows a hydraulic transmission with the aim of reducing the pressure on the control medium side such that it corresponds to the blocking action of the electrorheological control medium.

This design of a damping valve 2 connected in parallel is particularly suitable for single-tube dampers or shock-absorbing legs.

The operation is as follows: It is assumed that there is no electric field within the chambers 11 and 11a.

When the piston rod 5 moves downwards the pressure of the damping fluid is increased in the lower working chamber 53. This increased pressure is transmitted through the conduit 44 to the lower side of the valve body 13, i.e. to the pressure receiving face 47. The valve body 13 can be lifted against the spring action of the helical compression spring 38. The upwards movement of the valve body 13 is not substantially resisted by the electrorheological liquid contained within the collecting chamber 57 because this liquid can flow through bores 51 from the collecting chamber 57 into the annular chambers 11, 11a and can escape from the upper end of the annular chambers 11,11a through radial bores 60 of the capacitor tube 9a and 9 into the compensating chamber 36 for electrorheological liquid. The flow resistance within the capacitor chambers 11 and 11a is small because the viscosity of the electrorheological liquid within these capacitor chambers 11,11a is small. So the electrorheological liquid can easily escape from the collecting chamber 57 through bores 51, annular chambers 11 and 11a and bores 60 into the compensating chamber 36.

If, again assuming that there is no electrical field existing within the capacitor chambers 11 and 11a, the piston rod 5 is pulled upwards with respect to the cylinder 8 the pressure of the damping liquid within the working chamber 26 is increased. This increased pressure is transmitted through bores 45 into the intermediate space 46 and acts again onto the lower side of the valve body 13, namely to the pressure receiving face 48. Such the valve body 13 is again lifted upwards against the action of the helical compression spring 38. Again this upwards movement is not substantially braked by electrorheological liquid contained in the collecting chamber 50 because the electrorheological liquid having low viscosity in absence of electrical fields within the capacitor chambers 11 and 11a can flow through these capacitor chambers 11 and 11a along the flow path 27 and escape through the radial bores 60 into the compensating chamber 36.

One can note that, in spite of the fact, the damping liquid flows in opposite directions in response to the respective direction of movement of the piston rod 5 the pressure force exerted onto the valve body 13 by the electrorheological liquid contained within the collecting chamber 50 is always directed downwards wereas the pressure force exerted by the damping liquid onto the valve body 13 is always directed upwards irrespective of the direction of movement of the piston rod 5.

Assuming now that an electric field is applied within the chambers 11 and 11a, it is clear that the viscosity within this annular chambers 11 and 11a is increased. When now the valve body 13 is lifted by increased pressure, either within the working chamber 53 or within the working chamber 26, the upwards movement of the valve body 13 is prevented or at least braked, because electrorheological control liquid having increased viscosity now can't or can only slowly escape from the collecting chamber 50 through the bores 51, the annular chambers 11 and 11a and the bores 60 towards the compensating chamber 36. Such the damping behaviour of the vibration damper is a hard one for both axial movements of the piston rod 5 in response to the increased electric field within the chambers 11 and 11a.

When the piston rod comes to a standstill after a movement either in upwards or downwards direction the increased pressure, previously applied by the damping liquid through the valve body 13, falls and the valve body 13 returns to the position as shown in FIG. 7. As a result thereof a reduced negative pressure may occur within the collecting chamber 50. This negative pressure within the collecting chamber 50 is compensated for by opening of the check valve 37,37a which is provided by the axial bore 37 and the plate valve member 37a applied by a helical compression spring 38b towards the lower exit of the bore 37. The bore 37 is provided within a bloc which is axially fixed within the capacitor tube 9. When a negative pressure occurs within the collecting chamber 50 the check valve 37, 37a opens and electrorheological liquid can flow from the compensating chambers 36 back into the collecting chamber 50. So the collecting chamber 50 is rapidly filled again, even when the electrorheological liquid has a high viscosity in response to an electrical field applied thereto.

While specific embodiments of the invention have been shown and described in detail to illustrate the application of the inventive principles, it will be understood that the invention may be embodied otherwise without departing from such principles.

The reference numerals in the claims are only used for facilitating the understanding and are by no means restrictive.

I claim:

1. A vibration damper of variable damping effect comprising:

a cylindrical tube member having an axis, two ends and a cavity between said two ends, a piston rod member extending into said cavity through piston rod guiding and sealing means and being movable relative to said tube member along said axis, a piston unit connected with said piston rod member inside said cavity and separating two working chambers from each other, said working chambers containing a damping fluid, a damping fluid flow channel system connected with said working chambers permitting a flow of damping fluid therethrough in response to axial movement of said piston rod member relative to said tube member, damping fluid throttling means allocated to said damping fluid flow channel system for throttling said flow of damping fluid and thereby providing a damping effect on said axial movement of said piston rod member relative to said tube member, said damping fluid throttling means providing an electrically controllable flow resistance, said flow resistance being controlled by a volume of an electrorheological control fluid separated from said damping fluid, said electrorheological control fluid providing a control force for controlling said flow resistance of said damping fluid throttling means, said control force depending on the viscosity of said electrorheological fluid flowing through a control flow path, said electrorheological fluid being within said control flow path exposed to an electrical field of variable field intensity, said viscosity being responsive to variation of said field intensity, variation of the field intensity in a predetermined sense of one of a lowering sense and an increasing sense, providing a variation of the damping effect in a corresponding predetermined sense of one of a lowering sense and an increasing sense irrespective of the direction of movement of said piston rod member relative to said tube member.

2. A vibration damper as set forth in claim 1, said damping fluid throttling means comprising at least one valve unit with a valve body movable along a path of movement in response to fluid pressure forces acting thereupon, said valve body being loadable by a first pressure force exerted by said damping fluid and a second pressure force exerted by said volume of electrorheological control fluid separated from said damping fluid, said second pressure force exerted by said volume of electrorheological control fluid being controllable by variation of the viscosity of said electrorheological control fluid within said control flow path, said electrorheological control fluid being within said control flow path exposed to said electrical field of variable field intensity, said viscosity being responsive to a variation of said field intensity, said first pressure force acting on said valve body in a first predetermined direction along said path of movement, said second pressure force acting on said valve body in a second predetermined direction along said path of movement, said first and said second predetermined directions of said first pressure force and said second pressure force respectively being substantially unchanged irrespective of the direction of movement of said piston rod member relative to said tube member.

3. A vibration damper as set forth in claim 2, said volume of electrorheological control fluid being enclosed within a control chamber having two end portions, a restricted control flow path being arranged in series between said two end portions, a pressure of said electrorheological control fluid within a first one of said end portions providing said second pressure force.

4. A vibration damper as set forth in claim 3, a second end portion of said control chamber having a bleed orifice opening towards a storage space containing electrorheological control fluid.

5. A vibration damper as set forth in claim 4, said storage space being combined with volume compensating means.

6. A vibration damper as set forth in claim 5, said storage space being combined with pressurizing means pressurizing said electrorheological fluid within said storage space.

7. A vibration damper as set forth in claim 4, said storage space being connectable with said control chamber through a check valve or nonreturn valve opening towards said control chamber adjacent said first end portion thereof.

8. A vibration damper as set forth in claim 4, said valve body being urged in said second predetermined direction by resilient means in parallel with said second pressure force.

9. A vibration damper as set forth in claim 3, a second end portion of said control chamber being adjacent a floating wall portion, said floating wall portion being loaded by a pressure exerted by said damping fluid.

10. A vibration damper as set forth in claim 9, said second pressure force acting onto said valve body through resilient means.

11. A vibration damper as set forth in claim 9, said valve body being exposed to said pressure exerted by said damping fluid within a smaller pressure receiving area and said floating wall portion being exposed to said pressure exerted by said damping fluid within a larger pressure receiving area.

12. A vibration damper as set forth in claim 3, a second end portion of said control chamber being adjacent a floating wall portion, said floating wall portion being loaded by resilient means such as to increase the pressure of said electrorheological control fluid within said second end portion.

13. A vibration damper as set forth in claim 2, said at least one valve unit being in parallel with at least one further valve unit, said at least one further valve unit being a pressure control valve unit having a flow cross-section that is variable in response to variation of a pressure difference applied thereto.

14. A vibration damper as set forth in claim 13, said at least one valve unit being in parallel with at least one respective further valve unit for each direction of movement of said piston rod member relative to said tube member.

15. A vibration damper as set forth in claim 2, said first pressure force acting on said valve body in said first predetermined direction urging said valve body towards positions corresponding to an increased flow cross-sectional area of said valve unit, and said second pressure force acting on said valve body in said second predetermined direction opposing movement of said valve body towards said positions corresponding to an increased flow cross-section area of said valve unit.

16. A vibration damper as set forth in claim 2, said at least one valve unit being located adjacent said tube member.

17. A vibration damper as set forth in claim 2, said at least one valve unit being provided within said piston rod member.

18. A vibration damper as set forth in claim 2, said at least one valve unit connecting a working chamber containing an increased pressure of damping fluid irrespective of the direction of movement of said piston rod member and relative to said tube member and a damping fluid compensating chamber.

19. A vibration damper as set forth in claim 2, said at least one valve unit being provided for bi-directional flow of damping liquid between said two working chambers, said valve body having two different pressure receiving areas exposed to the pressure of damping fluid within the respective working chambers.

20. A vibration damper as set forth in claim 1, said control flow path being an annular flow path coaxial with respect to said tube member, said electrical field being radial with respect to said axis.

21. A vibration damper as set forth in claim 20, said control flow path being located radially outwardly of said cavity.

22. A vibration damper as set forth in claim 1, said damping effect being increasable in response to reducing said field intensity.

23. A vibration damper as set forth in claim 1, said control flow path within said piston rod member.

* * * * *

UNITED STATES PATENT AND TRADEMARK OFFICE
CERTIFICATE OF CORRECTION

PATENT NO. : 5,353,897
DATED : October 11, 1994
INVENTOR(S) : Felix Woessner

It is certified that error appears in the above-indentified patent and that said Letters Patent is hereby corrected as shown below:

Col. 2, lines 50, 52, 53 (both occurrences), 54, 58, 62, 64, 65, and 67, "said" should read --the--;
Col. 3, lines 30, 32, 33, and 34, "said" should read --the--;
Col. 8, line 28, "sportive" should read --supportive--;
Col. 8, line 38, "sportive" should read --supportive--;
Col. 11, line 28, "result" should read --result of--;
Col. 12, line 48, "chambers 11a" should read --chambers 11, 11a--;
Col. 14, line 4, "wereas" should read --whereas--;
Col. 18, line 7, "path" should read --path being located--.

Signed and Sealed this

Twenty-first Day of March, 1995

Attest:

BRUCE LEHMAN

Attesting Officer     Commissioner of Patents and Trademarks